Figure 1:
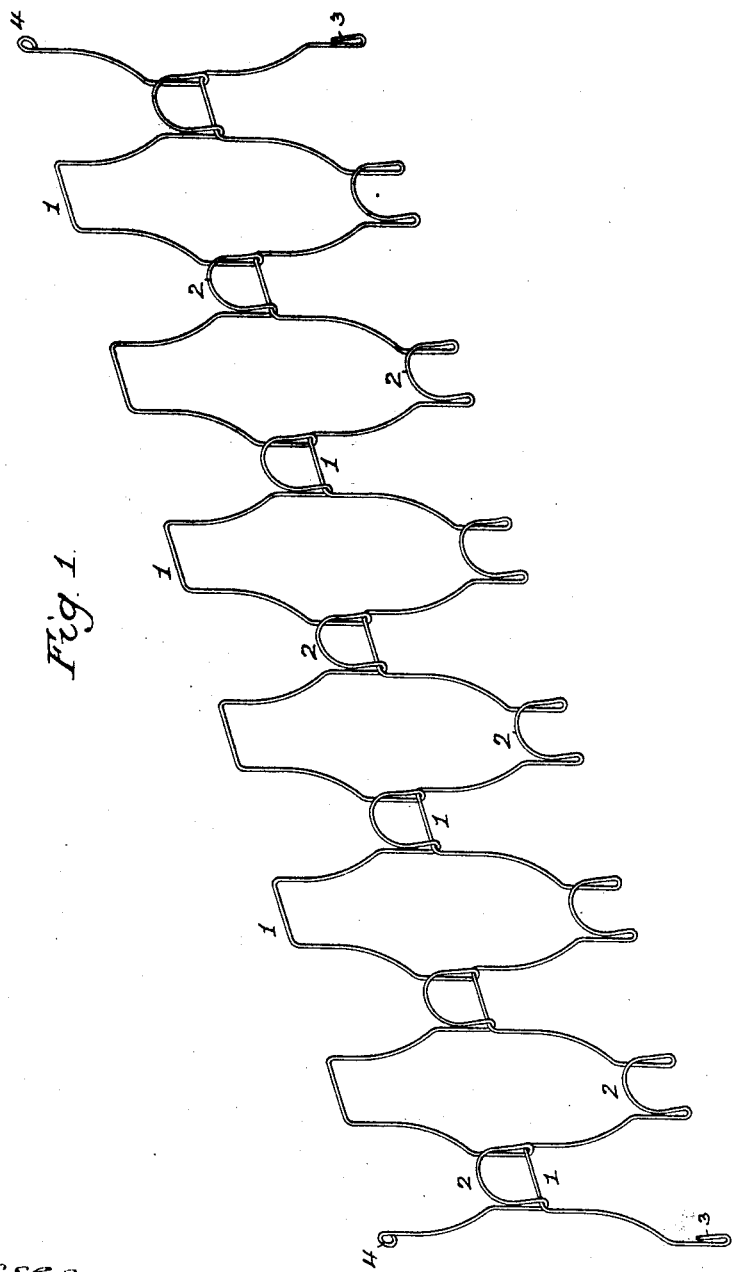

No. 795,214. PATENTED JULY 18, 1905.
G. R. FLOWERS.
MACHINE FOR MAKING WIRE CARD RACKS.
APPLICATION FILED JAN. 21, 1904.

6 SHEETS—SHEET 1.

Witnesses:
Frank L. A. Graham.
Titus H. Irons.

Inventor
George R. Flowers,
by his Attorneys,

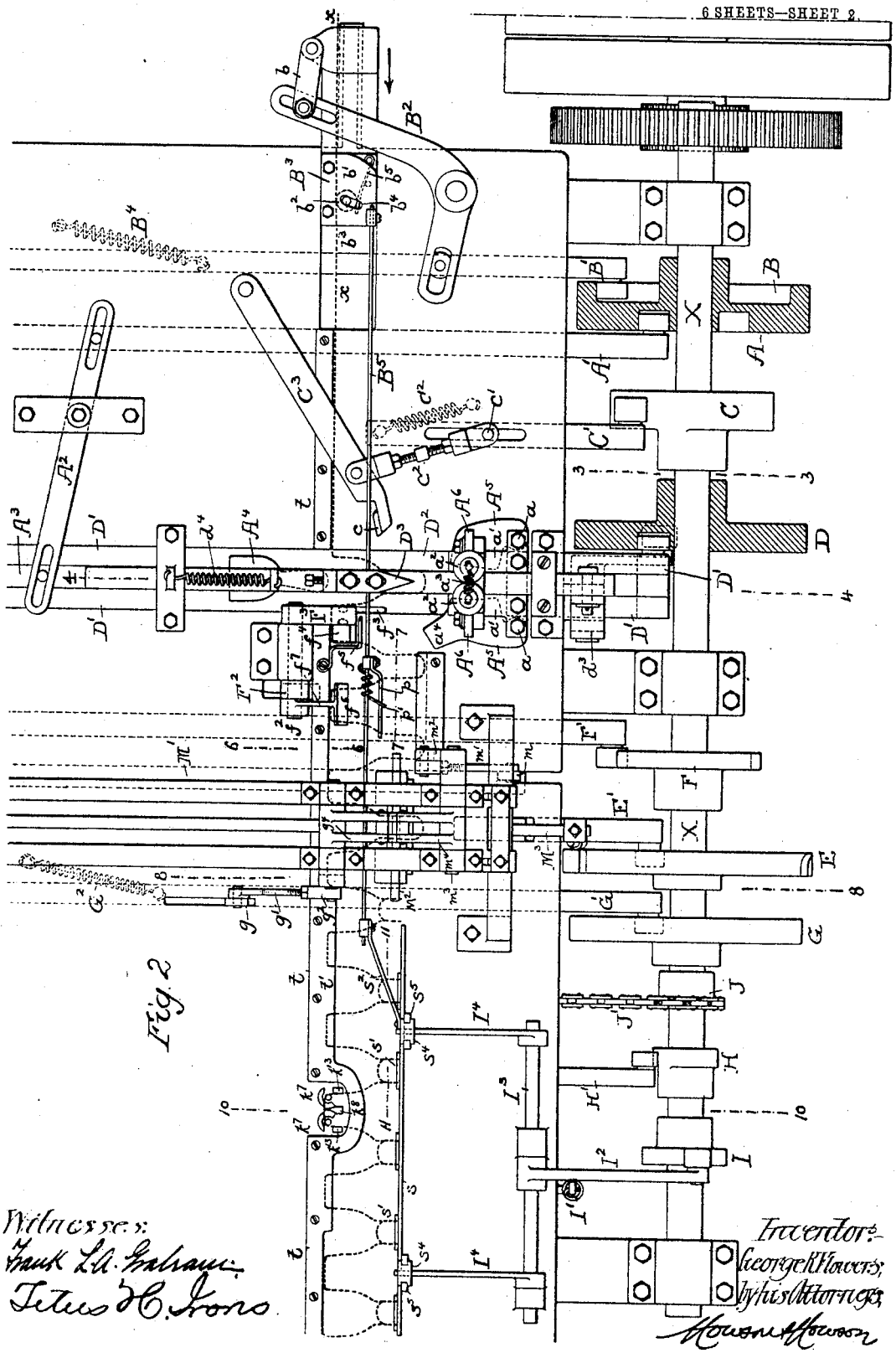

No. 795,214. PATENTED JULY 18, 1905.
G. R. FLOWERS.
MACHINE FOR MAKING WIRE CARD RACKS.
APPLICATION FILED JAN. 21, 1904.
6 SHEETS—SHEET 3.
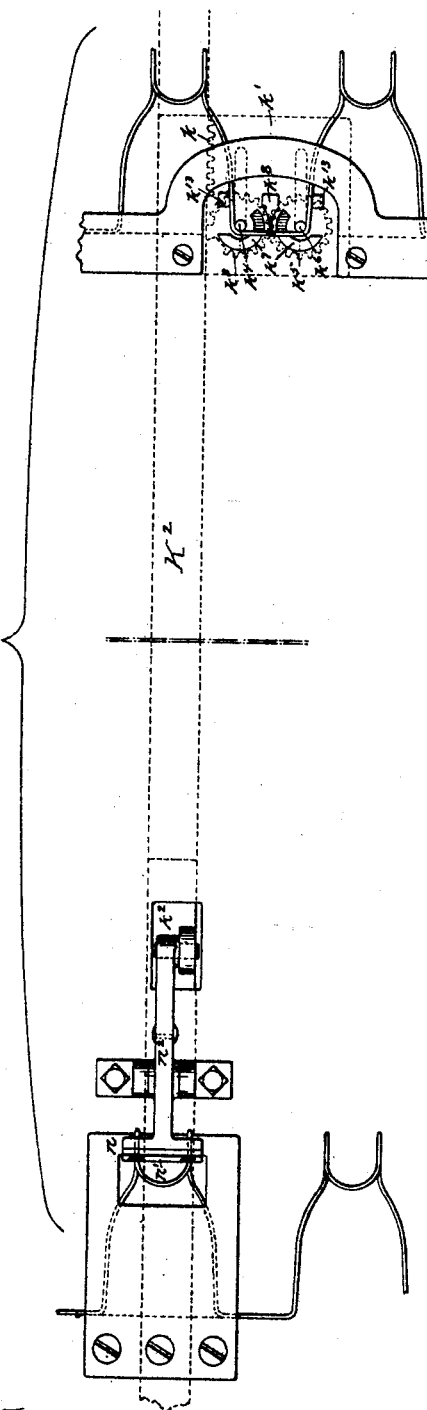
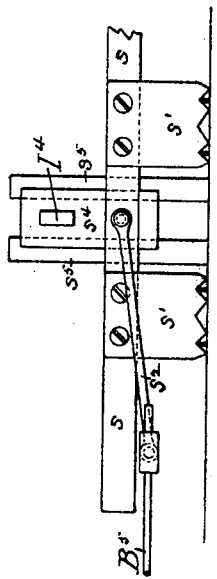
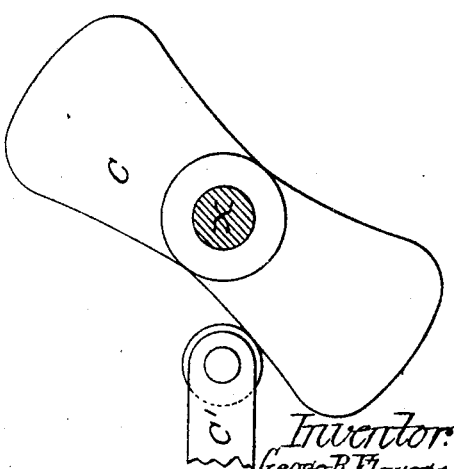
Witnesses:
Frank L. A. Graham.
Titus H. Irons.
Inventor:
George R. Flowers,
by his Attorneys,
Howson & Howson

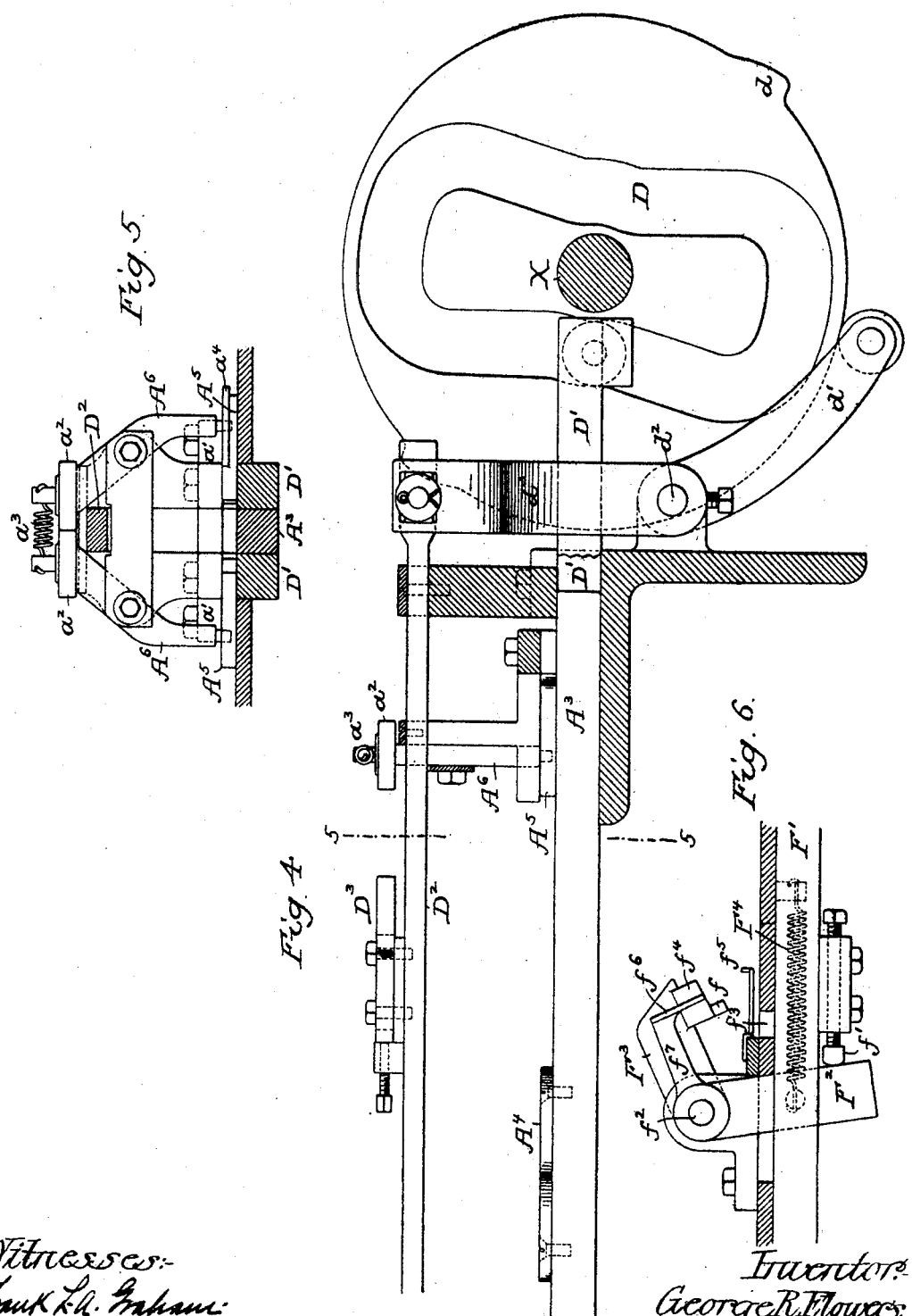

No. 795,214. PATENTED JULY 18, 1905.
G. R. FLOWERS.
MACHINE FOR MAKING WIRE CARD RACKS.
APPLICATION FILED JAN. 21, 1904.
6 SHEETS—SHEET 5.
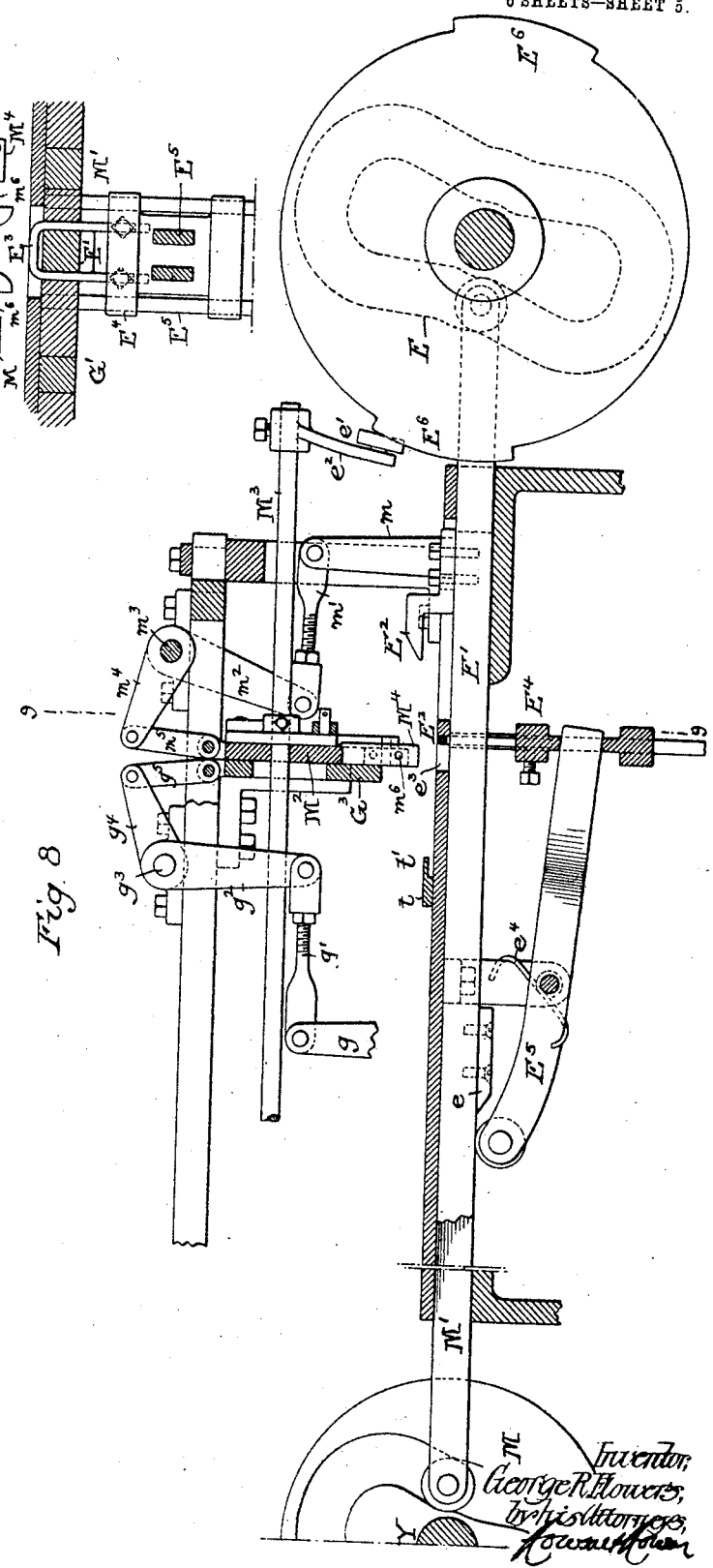

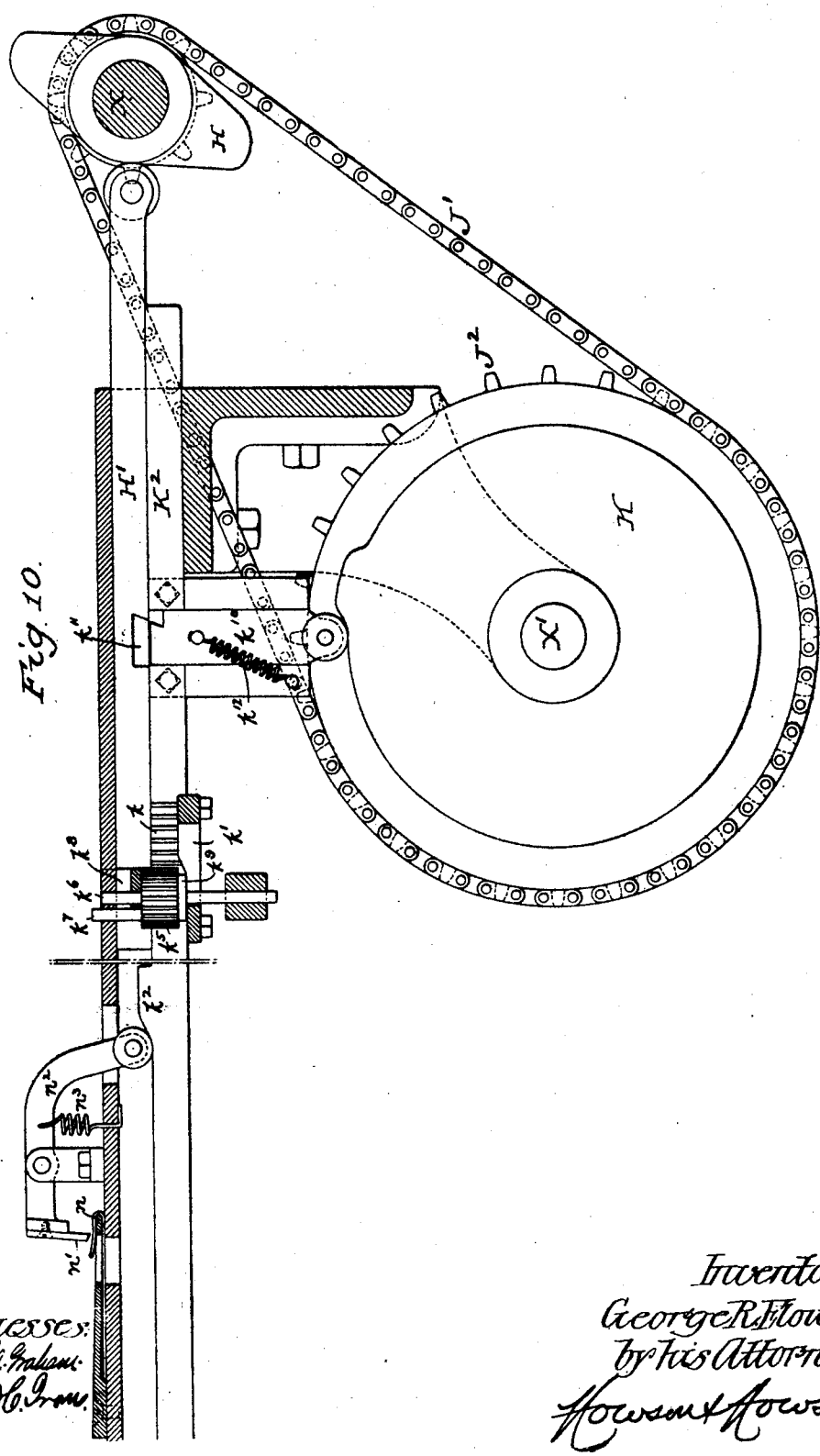

No. 795,214.

Patented July 18, 1905.

UNITED STATES PATENT OFFICE.

GEORGE R. FLOWERS, OF PHILADELPHIA, PENNSYLVANIA, ASSIGNOR TO ROBERT HENDERSON FARLEY, JR., OF PHILADELPHIA, PENNSYLVANIA.

MACHINE FOR MAKING WIRE CARD-RACKS.

SPECIFICATION forming part of Letters Patent No. 795,214, dated July 18, 1905.

Application filed January 21, 1904. Serial No. 190,073.

*To all whom it may concern:*

Be it known that I, GEORGE R. FLOWERS, a citizen of the United States, residing in Philadelphia, Pennsylvania, have invented a Machine for Making Wire Card-Racks, of which the following is a specification.

The object of my invention is to provide a machine for making the members of a certain form of wire card-rack, an object which I attain in the manner hereinafter set forth, reference being had to the accompanying drawings, in which—

Figure 1 is a perspective view illustrating two interlocked members of a wire card-rack, for the manufacture of which my invention has been designed. Fig. 2 is a plan view, partly in section, of the machine constituting the subject of my invention. Fig. 3 is a transverse section on the line 3 3, Fig. 2. Fig. 4 is a view, partly in side elevation and partly in transverse section, on the line 4 4, Fig. 2. Fig. 5 is a longitudinal section on the line 5 5, Fig. 4. Fig. 6 is a transverse section on the line 6 6, Fig. 2. Fig. 7 is a longitudinal section on the line 7 7, Fig. 2. Fig. 8 is a transverse section on the line 8 8, Fig. 2. Fig. 9 is a longitudinal section on the line 9 9, Fig. 8. Fig. 10 is a transverse section on the line 10 10, Fig. 2, showing also an element of the machine not illustrated in said Fig. 2. Fig. 11 is a longitudinal section on the line 11 11, Fig. 2; and Fig. 12 is a plan view of the devices for forming upon the sections of the rack the hooks and eyes whereby said sections are secured together.

A wire card-rack such as that for the manufacture of which my invention has been designed consists of two members which are practically similar except as to the end connections by which they are interlocked, each wire being bent to form a series of loops 1 and alternating hooks 2 for engagement with the loops of an adjoining member, the ends of the members being also interlocked by engagement of a hook 3 on one member with an eye 4 on the other. The machine which I have devised for forming these members of the rack has at one side a cam-shaft X, to which power is applied in any suitable manner, this shaft carrying a series of cams A, B, C, D, E, F, G, H, and I and a sprocket-wheel J, connected by a suitable chain-belt J' to another sprocket-wheel $J^2$ on a shaft X', which carries a cam K, and at the opposite side of the machine is another shaft Y, carrying a cam M.

The cam B operates the wire-feeding device of the machine, it being understood that the wire $x$ is drawn from a suitable reel and is fed into the machine in a straight course, being in its passage through the machine first bent to form the loops 1 and hooks 2 and then severed into proper lengths, upon which the hooks 3 and eyes 4 are formed.

The cam B acts, in conjunction with a spring $B^t$, to impart reciprocating motion to a slide B', which in turn imparts rocking motion to a bell-crank lever $B^2$, and the latter imparts motion through a link $b$ to a feed-slide $B^3$, traveling in a plane at right angles to that of the slide B'. This feed-slide $B^3$ has a pair of jaws $b'$, between which the wire $x$ passes, and between said jaws is also located a gripper-wheel $b^2$ with milled or serrated periphery, the spindle $b^3$ of this wheel passing through segmental slots $b^4$ in the jaws $b'$ and the wheel being acted upon by a spring $b^5$, which tends to press it constantly toward the wire $x$, the effect of this construction being that when the feed-slide is moved in the direction of the arrow, Fig. 2, the milled or serrated surface of the wheel $b^2$ will be caused to press firmly upon the wire and will cause the same to be carried forwardly with the feed-slide; but when said slide is moved in a direction the reverse of that indicated by the arrow the gripper-wheel being free to move away from the wire will not take any gripping hold upon the same, but will slip backwardly along it preparatory to taking a fresh hold upon it when the direction of movement of the feed-slide is again reversed.

The grooved cam A acts to impart reciprocating movement to a transverse slide A', and the latter in turn acts through a lever $A^2$ to impart reverse reciprocation to another slide $A^3$, which carries the bending-die $A^4$, whereby the first bend is imparted to the wire $x$, this die $A^4$ operating in conjunction with suitable laterally-swinging bending-jaws $A^5$ on a reversely-moving slide $D'$, operated from the grooved cam D, this slide $D'$ being in the present instance of duplex character and flanking the slide $A^3$, which carries the die $A^4$.

The laterally-swinging bending-jaws $A^5$ are hung to suitable pivot-pins $a$, carried by plates $a'$, which are mounted upon the slide $D'$, and said jaws are acted upon by levers $A^6$, also hung to suitable bearings carried by said slide $D'$, said levers having at their upper ends rollers $a^2$, whose spindles are connected by a spring $a^3$, having a tendency to draw the rollers normally toward and in contact with each other, as shown in Fig. 5, this operation serving to separate the bending-jaws $A^5$ to their fullest extent. In suitable bearings on the frame, however, is mounted an elevated slide $D^2$, which is actuated by lugs $d$ on the periphery of the cam D through the medium of an arm $d'$, rock-shaft $d^2$, and arm $d^3$, Fig. 4, and this elevated slide $D^2$ carries a wedge-block $D^3$ and is retracted by means of a spring $d^4$.

The parts are so timed that the die $A^4$ and bending-jaws $A^5$ move toward each other, and as soon as the wire has been bent around the die $A^4$ by the action of said jaws $A^5$ the wedge-block $D^3$ acts upon the rollers $a^2$ and serves to impart a quick inward movement to the bending-jaws $A^5$, thereby pressing the wire closely against the projecting finger or tongue of the die $A^4$ and setting the preliminary bend of the hook 2 of the rack member, the sides of the die $A^4$ being by preference beveled inwardly from the point of the die, as shown by dotted lines in Fig. 2, so that the spring of the wire when the same is released from the pressure of the bending-jaws $A^5$ will not unduly open the mouth of the loop formed around said die. To prevent rising of the wire from the table during this bending operation, one of the bending-jaws $A^5$ has a projecting plate $a^4$, as shown in Fig. 2.

In order to form a sharp angle between the hook and the loop on one side of the same, the wire is held on one side of the die $A^4$ by means of a clamping-finger $f$, around which the wire is bent by the die $A^4$ when the latter moves forward, this finger being lowered into clamping position and raised out of such position, so as to permit of a further forward feed of the wire by the action of the cam F and a spring $F^4$, said cam acting upon a transverse slide $F'$, which carries an adjustable bearing-lug $f'$, acting upon an arm $F^2$ on a rock-shaft $f^2$, the latter having another arm $F^3$, upon which the finger $f$ is mounted, said finger $f$ when depressed entering an opening $f^3$ in the table or bed over which the wire is fed, as shown in Figs. 2 and 6. The spring $F^4$ tends to maintain the arm $F^2$ constantly in contact with the lug $f'$. The proper sharp angle between the hook and the loop on the other side of the die $A^4$ is produced by a swinging die $c$, which is operated by the cam C, said cam, in conjunction with a spring $C^2$, reciprocating a transverse slide $C'$, which has a vertically-projecting post $c'$ connected by an adjustable link $C^2$ to a pivoted arm $C^3$, upon which the die $c$ is mounted, as shown in Fig. 2.

The arm $F^3$ has a head $f^4$, which bears upon a previously-formed loop to hold the same down upon the table of the machine while a fresh portion of the wire is being bent, and a bent finger $f^5$ also serves to aid in the performance of this duty, while a loop still farther in advance is pressed down on the table by a plate $f^6$, carried by an arm $f^7$ on the rock-shaft $f^2$, as shown in Figs. 2 and 6.

The mechanism for completing the bending of the hook 2 is operated by the cams E, G, and M of the machine and is shown in Figs. 2, 8, and 9. The grooved cam E reciprocates a slide $E'$, which carries a raised bending-finger $E^2$ and has on its under side a cam $e$. (See Fig. 8.) The grooved cam M reciprocates a slide $M'$, which has an upwardly-projecting post $m$ connected, by means of a link $m'$, to an arm $m^2$ on a rock-shaft $m^3$, which has another arm $m^4$ connected, by means of a link $m^5$, to a vertically-movable slide $M^2$, which provides bearings for a transverse rock-shaft $M^3$ and for a pair of slides $M^4$. These slides $M^4$ have fingers $m^6$, which when the slides are moved toward each other project into a recess $m^7$ in the slide $M^2$, but are free from said recess when the slides $M^4$ are retracted. The slides $M^4$ are reciprocated by the rock-shaft $M^3$ through the medium of arms $m^8$, links $m^9$, and levers $m^{10}$, and the rock-shaft is vibrated by means of lugs $E^6$ on the cam E, these lugs having a lateral thrust and acting upon an antifriction-roller $e'$ on an arm $e^2$ on the rock-shaft $M^3$, a spring $m^{11}$, interposed between one of the arms $m^8$ and one of the levers $m^{10}$, serving to hold the roller $e'$ in the path of the lugs $E^6$ and cause inward movement of the slides $M^4$. (See Fig. 9.) Straddling the bar $E'$ is a yoke $E^3$, which is normally withdrawn into a slot $e^3$, Fig. 8, in the table of the machine, but is carried by a vertically-guided slide $E^4$ beneath said table, said slide being reciprocated at the proper time by the cam $e$ on the slide $E'$, said cam acting on a lever $E^5$, which engages recesses in the slide $E^4$, and is also acted upon by a spring $e^4$ to move it in a direction the reverse of the movement imparted by the cam $e$. The cam G acts in conjunction with a spring $G^2$ to reciprocate a slide $G'$, which has an upwardly-projecting arm $g$ connected by a link $g'$ to an arm $g^2$ on a rock-shaft $g^3$, which has another arm $g^4$ connected by a link $g^5$ to a slide $G^3$, mounted in the rear of the slide $M^2$.

As the partially-bent wire is fed forward by a succession of intermittent movements over the table of the machine the partially-formed hooks are successively brought to rest in line with the recess $m^7$ of the slide $M^2$, and the latter, with the fingers $m^6$ of the slides $M^4$ projected, is caused to descend, so that said fingers bear upon said partially-formed hook. The slide $E'$ is then projected, the first effect of this movement being to lift the yoke $E^3$, so as to bend the partially-formed hook upwardly around said pins $m^6$, and as the movement of the slide continues the bending-finger $E^2$ completes the formation of the hook by bending it backwardly over the fingers, the slide $G^3$ finally descending so as to strike the hook back of the point, and thus depress this portion of the hook in order to give the desired crimp or upward flare to the point of the hook. The slide $E'$ is then retracted, and the fingers $m^6$ are also withdrawn from engagement with the hook preparatory to the rise of the slide $M^2$ and a repetition of the operations on the next succeeding partially-formed hook. All that now remains to be done in order to complete the formation of the rack member is to sever one of the loops 1 and bend said severed end so as to form the eyes 4 and to remove the looped end of one of the hooks 2 so as to form two hooks 3, and these operations are effected by mechanism actuated by the cams H and K.

As each rack member has upon it a number of loops 1 and hooks 2, the severing and bending operations are only performed at certain intervals covering a series of operations of the bending devices, and for this reason the cam K is operated at a slower rate of speed than the cams which are directly mounted upon the shaft X, such slower operation being effected by means of the sprocket-wheels J $J^2$ and the connecting-chain $J'$. The cam H constantly reciprocates a slide $H'$, beneath which is located another slide $K^2$, which latter slide is provided with a rack $k$ and cams $k'$ and $k^2$, as shown in Figs. 10 and 12. The rack $k$ acts upon a pinion $k^3$, carried by a shaft $k^4$, which is free both to turn and to rise and fall through bearings formed in the main table of the machine and in the bracket beneath the same. The pinion $k^3$ meshes with a similar pinion $k^5$ on another shaft $k^6$, similar to the shaft $k^4$. Each of the pinions $k^3$ and $k^5$ carries a bending-die $k^7$, and located at a point intermediate between the two shafts $k^4$ and $k^6$ is a shear-blade $k^8$, which rests upon the tops of the pinions and has rising-and-falling movement similar to that of the shafts $k^4$ and $k^6$.

The shafts $k^4$ and $k^6$ and the shear-blade $k^8$ are normally depressed, so that their tops are flush with or below the level of the table, so that the loops 1 of the rack member can be readily fed over the same. After a certain number of loops have thus been fed forwardly the shafts $k^4$ $k^6$ and shear-blade $k^8$ are projected through one of the loops, and the bending-dies $k^7$ are then partially rotated, the effect of which is to centrally sever the loop and bend the severed ends around the projecting portions of the shafts $k^4$ and $k^6$, after which the bending-dies are restored to their normal position, the shafts $k^4$ $k^6$ and the shear-blade $k^8$ are depressed, and the intermittent forward feed of the rack member continues.

The rocking movements of the bending-dies $k^7$ are effected by the action of the rack $k$ upon the pinion $k^3$, and the vertically-reciprocating movements of the shafts $k^4$ and $k^6$ and shear-blade $k^8$ are effected by the lifting movement of the cam $k'$, which acts upon washers $k^9$ at the bases of the pinions $k^3$ and $k^5$.

In order to prevent deflection of the side members of the loop 1 when the eyes 4 are being formed by the bending action of the dies $k^7$, said side members of the loop bear upon abutment-blocks $k^{13}$, which are carried by the same plate as the shear-blade $k^8$ and rise and fall with the same.

In order that the rack-slide $K^2$ may act only at the desired intervals in the operation of the machine, said slide is normally free from connection with the slide $H'$, but can be locked thereto when desired by means of a bolt $k^{10}$, guided on the slide and adapted to enter a slot $k^{11}$ in the slide $H'$ when projected by the cam K, the retraction of said bolt $k^{11}$ being effected by means of a spring $k^{12}$. (See Fig. 10.)

At the same time that the above operations are being performed the looped end of the hook of another rack member is being severed to form the hooks 3, for it should be understood that although in the drawings I have shown but one set of bending devices the machine as constructed will have these bending devices duplicated at the other side of the table, the duplicate set of bending devices being operated by the same set of transverse slides and shafts as are employed to operate the first set, so that the formation of two sets of rack members will be correspondingly effected.

The means for severing the loop of the hook 2 are shown in Figs. 10 and 12 and consist of a lower shear-blade $n$, fixed to the main table of the machine and constituting at the same time a guide for the rack member, the projecting portion of this shear-blade being overlapped by the hook 2 and being slotted or recessed at a point beneath the looped inner end of said hook. Coöperating with said fixed lower shear-blade $n$ is a movable upper shear-blade $n'$, which is carried by a lever $n^2$, hung to a suitable bearing on the table and acted upon by the cam $k^2$ on the slide $K^2$ and by a spring $n^3$, as shown in Fig. 10. At the proper time, therefore, the upper shear-blade will be depressed and by the conjoint action of the same and the fixed lower blade the looped end of the hook 2 will be severed, with the result of forming two hooks 3, each adapted to engage with the eye 4 of an adjoining rack member which has been formed in the manner above described by the conjoint action of the bending-dies $k^7$, shear-blade $k^8$, and pivot-shafts $k^4$ and $k^6$.

In many cases it may be advisable to take hold of the rack member at various points throughout its length in order to insure the effective feeding of the same in a straight line through the machine, and I have in the drawings shown several feeding devices supplemental to the wire-feeder $B^3$, but all operated in unison therewith by means of a rod $B^5$, projecting forwardly from said feeder. This rod carries a pivoted pawl $p$, hung to a block on the rod and toothed or serrated at the lower end for bearing upon the rack member after the preliminary bending of the same by the die $A^4$ and jaws $A^5$, a spring $p'$ serving to depress the pawl, so as to maintain it in engagement with the rack, the pawl slipping over the rack on its rear movement, but engaging and pushing the rack forward on its forward movement. (See Fig. 7.) Another feeder, which acts upon the rack as it is nearing the end of its travel, is that shown in Fig. 11 and consists of a bar $s$, having a number of depending toothed jaws $s'$ for engaging successive hooks 2 of the rack, said bar having longitudinal movement by reason of its connection with the rod $B^5$ by means of a link $s^2$ and also having vertical movement, so that its jaws $s'$ can be lifted clear of or dropped into engagement with the hooks 2 of the rack. This vertical movement is imparted by means of the cam I on the shaft X and a spring I′, said cam and spring acting upon an arm I² on a rock-shaft I³, which has other arms I⁴ engaging slides $s^4$, which are vertically guided between posts or bars $s^5$ on the table and are grooved for the reception of the longitudinally-reciprocating bar $s$.

A longitudinal bar $t$ on the table of the machine serves as a guide for the rack member in its passage through the machine, this bar being in certain portions of its length provided with a flange $t'$, which overhangs the rack, and thus serves to retain the same in its proper position in contact with the table.

A machine constructed in the manner which I have described effects the continuous and automatic production of the members of a wire card-rack such as are now made by hand. Hence the production of such racks is facilitated and cheapened.

It will be evident that in carrying out my invention the mechanical details of the same may be varied in many different ways without departing from the essential principles of the invention. Hence my invention is not to be understood as limited in this respect.

Having thus described my invention, I claim and desire to secure by Letters Patent—

1. In a machine for forming members of a wire card-rack, the combination of means for feeding forward a wire, preliminary bending-dies for forming from said wire a connected series of oppositely-projecting loops, means for bending one set of said loops into hook form, means for cutting off the tops of certain of said hooks, and means for severing and bending certain of the loops to form eyes, substantially as specified.

2. In a machine for forming members of a wire card-rack, the combination of means for feeding forward a wire, preliminary bending-dies for forming, from said wire, a connected series of oppositely-projecting loops, means for bending one set of loops into hook form, and means for crimping said hooks, substantially as specified.

3. In a machine for forming members of a wire card-rack, the combination of means for feeding forward a wire, preliminary bending-dies for forming, from said wire, a connected series of oppositely-projecting loops, and devices for severing certain of one set of loops and bending the severed ends to form eyes, substantially as specified.

4. In a machine for forming members of a wire card-rack, the combination of means for feeding forward a wire, preliminary bending-dies for forming, from said wire, a connected series of oppositely-projecting loops, means for bending one set of said loops into hook form, and devices for severing certain of the other set of loops and bending said severed ends to form eyes, substantially as specified.

5. In a machine for forming members of a wire card-rack, the combination of means for feeding forward the wire, preliminary bending-dies for forming, from said wire, a connected series of oppositely-projecting loops, means for bending one set of said loops into hook form, and means for cutting off the looped ends of certain of said hooks, substantially as specified.

6. The combination, in a machine for forming members of a wire card-rack, of a feeding device, a reciprocating bending-die, a pair of bending-jaws, and a finger independent of said jaws for alternately engaging and releasing the wire on one side of said die, substantially as specified.

7. The combination, in a machine for forming members of a wire card-rack, of a feeding device, a reciprocating bending-die, a pair of bending-jaws, and a vibrating die independent of said jaws for engaging the wire at the base of said bend and imparting a sharp angle thereto, substantially as specified.

8. The combination, in a machine for forming members of a wire card-rack, of a feeding device, dies for bending the wire so as to form oppositely-projecting series of loops thereon, and means for bending one series of said loops into hook form, said means comprising fingers around which the loop can be bent, and a device for bending the loop from a horizontal to an upright position around said fingers, substantially as specified.

9. The combination, in a machine for forming members of a wire card-rack, of a feeding device, means for bending the wire so as to form oppositely-projecting series of loops thereon, and means for bending one series of loops into hook form, said means comprising fingers around which the loops can be bent, a vertically-reciprocating device for bending said loops from a horizontal to upright position around said fingers, and a horizontally-reciprocating bender for completing the hook, substantially as specified.

10. The combination, in a machine for forming members of a wire card-rack, of a feeding device, means for bending the wire so as to form oppositely-projecting series of loops thereon, and means for bending one series of loops into hook form, said means comprising fingers around which the loops can be bent and a vertically-reciprocating slide carrying said fingers, substantially as specified.

11. The combination, in a machine for forming members of a wire card-rack, of a feeding device, means for bending the wire so as to form oppositely-projecting series of loops thereon, and means for bending one series of loops into hook form, said means having, as elements, a pair of laterally-reciprocating fingers around which the loops can be bent, substantially as specified.

12. The combination, in a machine for forming members of a wire card-rack, of a feeding device, means for bending the wire so as to form oppositely-projecting series of loops thereon, and means for bending one series of loops into hook form, said means having, as elements, a pair of laterally-reciprocating fingers around which the loops can be bent, and a vertically-reciprocating slide in which said fingers are mounted, substantially as specified.

13. The combination, in a machine for forming members of a wire card-rack, of a feeding device, means for bending the wire so as to form oppositely-projecting series of loops thereon, means for bending one series of loops into hook form, said means comprising fingers around which the loops can be bent, means for starting the bend, and for completing the hook, and a presser for crimping the hook, substantially as specified.

14. The combination, in a machine for forming members of a wire card-rack, of a feeding device, means for bending the wire so as to form oppositely-projecting series of loops, means for bending one series of loops into hook form, and devices for forming hooks on certain of the opposite series of loops, said devices being movable into and out of engagement with the loops and comprising a pair of bending-dies, and a pair of axial shafts serving as pins around which the severed loop can be bent, substantially as specified.

15. The combination, in a machine for forming members of a wire card-rack, of a feeding device, means for bending the wire so as to form oppositely-projecting series of loops, means for bending one series of loops into hook form, and devices for forming hooks on certain of the opposite series of loops, said devices being movable into and out of engagement with the loops and comprising a pair of bending-dies, axial shafts serving as pins around which the loop can be bent by said dies, and a shearing-blade coöperating with the dies to effect the severing of the loop, substantially as specified.

16. The combination, in a machine for forming members of a wire card-rack, of a feeding device, means for bending the wire so as to form oppositely-projecting series of loops, means for bending one series of loops into hook form, and devices for forming hooks on certain of the opposite series of loops, said devices being movable into and out of engagement with the loops and comprising a pair of bending-dies, axial shafts serving as pins around which the loop can be bent by said dies, a shearing-blade coöperating with the dies to effect the severing of the loop, and abutments to prevent deflection of the sides of the loop, substantially as specified.

17. The combination, in a machine for forming members of a wire card-rack, of a feeding device, means for bending the wire into oppositely-projecting series of loops, means for bending one series of loops into hook form, and means for severing the looped ends of certain of said hooks, said means comprising a lower fixed shear over which the hook is fed, and an upper movable shear coöperating with said lower fixed shear to sever the looped end of the hook, substantially as specified.

18. The combination, in a machine for forming wire card-racks, of means for bending the wire into opposite projecting series of loops, and a series of feeding devices acting independently upon said looped wire after it has passed the bending devices, substantially as specified.

19. The combination, in a machine for forming wire card-racks, of a feeding device for the wire, means for bending the wire into opposite projecting series of loops, and one or more feeding devices acting upon said looped wire after it has passed the bending devices, substantially as specified.

20. The combination, in a machine for forming wire card-racks, of means for bending the wire into opposite projecting loops, means for bending one series of loops into hook form, and a feeding device acting upon said hooks to effect forward feeding of the bent wire, substantially as specified.

21. The combination, in a machine for forming wire card-racks, of means for bending the wire into opposite projecting loops, means for bending one series of loops into hook form, and a feeding device acting upon said hooks to effect forward feeding of the bent wire, said feeding device having both longitudinal movement and movement in a direction transverse thereto, substantially as specified.

22. The combination, in a machine for making wire card-racks, of means for bending the wire into opposite projecting loops, means for bending one series of loops into hook form, a feeding device acting upon the looped wire before it is thus hooked, and a feeding device acting on the hooked wire, substantially as specified.

23. The combination, in a machine for making wire card-racks, of means for bending the wire into opposite projecting loops, means for bending one series of loops into hook form, a feeding device acting upon the looped wire before it is thus hooked and a feeding device acting on the hooked wire, said latter feeding device having both longitudinal movement and movement in a plane transverse thereto, substantially as specified.

24. The combination, in a machine for forming wire card-racks, of a feeding device, means for bending the wire in opposite projecting loops, means for bending one series of loops into hook form, and a guide-bar for directing the looped and hooked wire longitudinally through the machine, substantially as specified.

25. The combination, in a machine for forming wire card-racks, of a feeding device, means for bending the wire in opposite projecting loops, means for bending one series of loops into hook form, and a guide-bar for directing the looped and hooked wire longitudinally through the machine, said guide-bar having a portion overhanging the looped wire and serving to retain the same in a direction transverse to its longitudinal movement, substantially as specified.

In testimony whereof I have signed my name to this specification in the presence of two subscribing witnesses.

GEO. R. FLOWERS.

Witnesses:
HENRY NOAR,
JOS. H. KLEIN.